United States Patent [19]

Abe

[11] Patent Number: 4,677,259
[45] Date of Patent: Jun. 30, 1987

[54] POSITION DETERMINATION DEVICE
[75] Inventor: Kiyomi Abe, Noda, Japan
[73] Assignee: Pentel Kabushiki Kaisha, Tokyo, Japan
[21] Appl. No.: 846,569
[22] Filed: Mar. 31, 1986
[30] Foreign Application Priority Data Mar. 29, 1985 [JP] Japan ............... 60-46359[U]

[51] Int. Cl.$^4$ ............................................ G08C 21/00
[52] U.S. Cl. .......................................... 178/18; 29/829
[58] Field of Search .................. 178/18, 19, 20; 340/206, 209, 711; 29/825, 829, 846; 174/68.5; 428/901; 361/404, 409, 416

[56] References Cited
U.S. PATENT DOCUMENTS 4,455,452  6/1984  Schuyler ................. 178/18

Primary Examiner—Stafford D. Schreyer
Attorney, Agent, or Firm—Bruce L. Adams; Robert E. Burns; Emmanuel J. Lobato

[57] ABSTRACT

A data tablet has an electrode matrix that includes two sets of electrodes, the sets of electrodes being arranged along coordinate axes on opposite sides of an intermediate insulating layer in such a way that the electrodes in one set are orthogonal to the electrodes in the other set. The electrodes of each of said sets constituting a first group and a second group, the electrodes in said first group being connected respectively to leading lines arranged in the same plane as of said electrodes in said first group, and the electrodes in said second group being connected via through-holes formed in said intermediate insulating layer respectively to other leader lines arranged in the same plane as of said electrodes of the other set.

The data tablet can be produced by forming a first circuit pattern on a substrate of an electrical insulating material by printing, then printing an insulating pattern on the substrate thereby forming the intermediate insulating layer overlaid on the first circuit pattern, and printing a second circuit pattern on the intermediate insulating layer. When the second circuit pattern is printed, the parts of said pattern on the apertures in the intermediate insulating layer overlie the first circuit pattern under the intermediate insulating layer.

5 Claims, 1 Drawing Figure

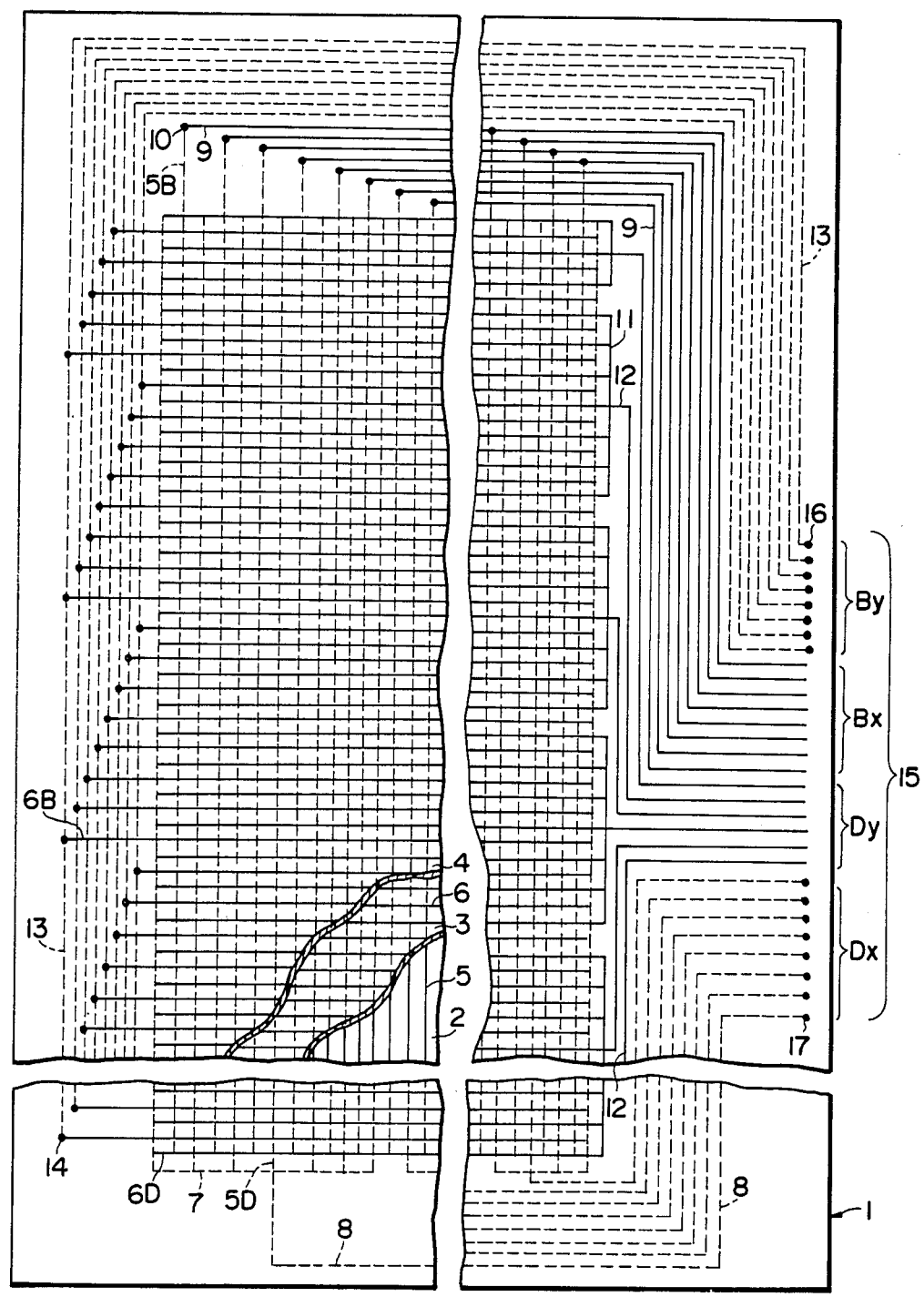

POSITION DETERMINATION DEVICE

FIELD OF THE INVENTION

The present invention relates to a position determination device, and more particularly, to a structure of a data tablet used in a coordinate digitizer, which identifies coordinate positions digitally, and a method of producing it.

A coordinate digitizer has various applications such as input systems for handwritten characters and drawings, alphanumeric keyboards, intelligent terminal systems cooperative with cathode-ray tube (CRT) displays, and copying area assigning apparatuses in copying machines. When digitizers are classified in accordance with operational principles, there are several known types of digitizers such as electromagnetically coupled type or inductively coupled type, capacitively coupled type, optically coupled type, and so on. This classification is based on the manner of the signal coupling in the digitizer between a probe and a data tablet. Data tablets of these types are different indeed, but they are the same in that they have a two-dimensional matrix consisting of a group of X-axis electrodes and a group of Y-axis electrodes that intersect orthogonally, and are accompanied by similar technical problems requiring solution.

The resolution of various technical problems involved in this field suggested by the inventor and co-inventor have been disclosed in U.S Pat. Nos. 3,974,332 entitled "Tablet for Use in a Coordinate Digitizer," 4,136,336 entitled "Keyboard Apparatus," 4,194,083 entitled "Capacitively Coupled Tablet," and 4,492,818 entitled "Tablet Input Apparatus."

DESCRIPTION OF THE PRIOR ART

In inductively coupled type tablets and capacitively coupled tablets, a set of electrodes of one of the coordinate axes are placed on a substrate, while a set of electrodes of the other of coordinate axes are placed on the upper side of an intermediate insulating layer that covers the former set of electrodes. Conventionally, such tablets are produced by techniques for producing double-sided printed circuit substrates, wherein terminals of one set of electrodes are led out by a known through-hole technique to the same plane as terminals of the other set of electrodes.

In tablets for graphic systems that require high resolution, the two-dimensional matrix consists of a very fine lattice, and the electrode wires must be arranged with the interval being, for example, 3 mm. In such tablets, to arrange terminals of the sets of electrodes at a predetermined location concentrically in the same plane, a large number of leader lines are required for connecting the electrodes to the terminals. If the two-dimensional matrix is to be an effective writable area, it is required that an area for a large number of leading lines is provided around the effective writable area, and as a result, the cost of production increases and the apparatus is larger.

To reduce the area where the leader lines are arranged, it has been suggested that the leader lines of part of the electrodes of each set are arranged on the side where the leader lines of the electrodes of the set of the opposite side are present. Although this suggestion allows the wiring pattern of the leader lines to be simplified, since part of the electrodes of each set and the leader lines arranged around the electrodes on the opposite side are to be connected, a great number of through-holes must be formed in the intermediate insulating layer, which requires a known through-hole plating. With respect to the quality control of a double-sided printed circuit substrate with a large area, it is recognized that the most difficult problem is that defective conductivity is observed at the through-hole sections, which, from a practical point of view, must be solved.

SUMMARY OF THE INVENTION

The general object of the present invention is to provide a data tablet having a wiring pattern that allows the area for leader line laid regions to be reduced relative to the effective writable area.

Another object of the present invention is to provide a method of producing a data tablet wherein though it has a wiring pattern involving a number of through-hole connections, the electrical connection at the through-holes is positively secured.

According to the present invention, a data tablet is provided which is characterised in that it has an electrode matrix that includes two sets of electrodes, the sets of electrodes being arranged along coordinate axes on opposite sides of an intermediate insulating layer in such a way that the electrodes in one set are orthogonal to the electrodes in the other set, the electrodes of each of said sets constituting a first group and a second group, the electrodes in said first group being connected respectively to leading lines arranged in the same plane as of said electrodes in said first group, and the electrodes in said second group being connected via through-holes formed in said intermediate insulating layer respectively to other leader lines arranged in the same plane as of said electrodes of the other set.

According to the present invention, such a data tablet can be produced by forming a first circuit pattern on a substrate of an electrical insulating material by printing, then printing an insulating pattern on the substrate thereby forming an intermediate insulating layer overlaid on the first circuit pattern, and printing a second circuit pattern on the intermediate insulating layer. The first circuit pattern includes one set of electrodes, leader lines for the electrodes of a first group of said one set, and leader lines for electrodes of a second group of the other set, while said second circuit pattern includes the electrodes of the other set, leader lines for electrodes of the first group of the other set, and leader lines for the electrodes of the second group of said one set. The insulating pattern is formed with a plurality of apertures for electrically connecting the electrodes of the second group of the sets to the leading lines related to the electrodes. According to this method, when the second circuit pattern is printed, the parts of said pattern on the apertures in the intermediate insulating layer overlie the first circuit pattern under the intermediate insulating layer thereby they are connected electrically in the same manner as the known through-holes.

According to a preferred embodiment of the present invention, the printing of the circuit patterns is carried out with an electrically conductive ink or coating containing carbon or silver powder, and the intermediate insulating layer is formed by a coating agent comprising bismaleimide triazine (BT) resin. BT resin is a thermosetting polyimide resin that mainly consists of a bismaleimide and a triazine resin and has imido groups in the molecule, and the use of BT resin in electronic devices is known, for example, from U.S. Pat. No. 4,530,001 that discloses its use in semiconductor devices, while when it is used in a data tablet, migration of the electroconductive ink can be effectively prevented.

BRIEF DESCRIPTION OF THE DRAWING

The accompanying FIGURE is a plane view of a data tablet according to the present invention, showing the internal structure with parts broken away for illustrative purposes.

DETAILED DESCRIPTION OF THE PREFERRED EMBODIMENT

Referring to the FIGURE, a data tablet 1 comprises a substrate 2, an intermediate insulating layer 3, and a surface insulating layer 4 that are made of electrical insulating materials, for example, the substrate 2 comprises a polyester resin film, the intermediate insulating layer 3 comprises a bismaleimide triazine (BT) resin coating agent, and the surface insulating layer 4 comprises the same material as the intermediate insulating layer 3.

On the substrate 2 are arranged electrodes along one of coordinate axes, for example, X-axis electrodes 5, and on the intermediate insulating layer 3 are arranged electrodes along the other axis, for example, Y-axis electrodes 6. The X-axis electrodes 5 comprise two groups, that is, digit electrodes 5D and bit electrodes 5B that are arranged alternately. The digit electrodes 5D are connected to several digit units via digit forming lines 7 laid in the same plane as of the digit electrodes 5D, and are blocked. Similarly, the Y-axis electrodes 6 comprise two groups, that is, digit electrodes 6D and bit electrodes 6B, and the digit electrodes 6D are connected to several digit units via digit forming lines 11 laid in the same plane as of the digit electrodes 6D, and are also blocked. A digitizer is commonly known to use such a data tablet wherein the electrodes 5 and 6 comprise digit electrodes 5D, 6D and bit electrodes 5B, 6B, respectively, as described above, and since such an electrode constitution is not directly related to the present invention, further explanation thereof will be omitted.

For illustrative purposes in the FIGURE, a surface protective layer 4 is considered transparent, the circuit pattern formed on the intermediate insulating layer 3 formed under the layer 4 is shown as a solid line, and the circuit pattern formed on the substrate under the intermediate insulating layer 3 is shown as a dotted line.

According to the present invention, on the substrate 2 are formed, in addition to the X-axis electrodes 5 and the X-axis digit forming lines 7, leader lines 8 for the X-digit electrodes 5D corresponding to the one group of the X-axis electrodes 5, and leader lines 13 for the Y-axis bit electrodes 6B of the Y-axis electrodes 6. On the other hand, on the intermediate insulating layer 3 are formed, in addition to the Y-axis electrodes 6 and Y-axis digit forming lines 11, leader lines 12 for the Y-axis digit electrodes of the Y-axis electrodes 6 and leader lines 9 for the X-axis bit electrodes 5B corresponding to the other group of X-axis electrodes 5. The matrix containing the X-axis electrodes 5 and Y-axis electrodes 6 forms an effective writable area and the leader lines 8, 9, 12 and 13 for the groups of the electrodes of the sets are provided around the effective writable area. In this case, the leader lines positioned on the right side of the FIGURE are drawn for the convenience of illustration as if they were spaced and parallel, but actually the leader lines 13 can be positioned just below the leader lines 9 and similarly the leader lines 12 can be positioned just below the leader lines 8. Whereas the leader lines 9 and 13 of the bit electrodes 5B and 6B of the sets are respectively formed on the opposite sides of the intermediate insulating layer 3, the related bit electrodes and leader lines (5B and 9, and 6B and 13) are connected electrically via apertures 10, 14 (show as dots in the FIGURE) formed in the intermediate insulating layer 3. Ends of the leader lines 8, 13 formed on the substrate 2 are led onto the intermediate insulating layer 3 via the apertures 16, 17 formed in the intermediate insulating layer 3. Thus, at a terminal section 15 are gathered terminals By for the Y-axis bit electrodes, terminals Bx for the X-axis bit electrodes, terminals Dy for the Y-axis digit electrodes and terminals Dx for the X-axis digit electrodes, which are all connected via a known flexible printed circuit panel (not shown) to a control unit.

The tablet according to the present invention can be produced readily by printing a first circuit pattern on the substrate 2 with an electrically conductive ink, forming the intermediate insulating layer 3 by printing with a BT resin coating agent, and printing a second circuit pattern on the intermediate insulating layer 3 with an electrically conductive ink. In this case, when the intermediate insulating layer 3 is formed, an insulating pattern having apertures is printed for connecting the first circuit pattern to the second circuit pattern. As a result, when the second circuit pattern is printed, the electrically conductive ink forming the second circuit is overlaid on the first pattern below the apertures thereby connecting the patterns via the apertures. As a desirable electrically conductive ink can be mentioned phenolic resin-based thermosetting type inks containing carbon or silver powder, which is desirably printed by screen printing. As a coating agent for forming the intermediate insulating layer can be mentioned bismaleimide triazine (BT) resins. The intermediate insulating layer 3 of a BT resin can be formed in such a way that after a coating agent is applied by printing, it is dried by far infrared drying at 150° to 160° C. for about 10 min.

According to the present invention, the electrodes 5B, 6B constituting the respective first groups of the two groups of the sets are electrically connected via the leader lines 9, 13 arranged on opposite sides of the intermediates insulating layer 3 and the apertures 10, 14 formed in the intermediate insulating layer 3, and therefore although the number of the points for the through-hole connection is increased in this circuit arrangement, the area required for the arrangement of the leader lines can be reduced. According to the present invention, since the intermediate insulating layer 3 that will overlie the first circuit pattern is formed by printing with a BT resin in such a way that the intermediate insulating layer 3 has apertures, that is, parts without the ink where through-hole connection will be carried out, and the second circuit pattern is formed by printing, resulting in the printing over the apertures, the positivity of the through-hole connection at the apertures can be easily secured in comparison to the known through-hole plating method.

Although a particular embodiment of the present invention has been illustrated and described, it should be understood that changes and modifications may be made and the embodiment is not intended to limit the scope of the invention. Although, in the particular embodiment, the electrodes arranged along coordinate axes are digit electrodes and bit electrodes, the electrodes of the sets may be a sequential skinning system as disclosed in U.S. Pat. No. 4,136,336 and in that case the electrodes of the sets may be divided, for example, into an odd number group and an even number group.

What is claimed is:

1. A method of producing a data tablet including two sets of electrodes that are arranged along coordinate axes orthogonally, the electrodes of each set being divided into a first group and a second group, which method comprises the following steps:
   a. preparing a substrate of an electrically insulating material,
   b. forming a first circuit pattern on said substrate, the first circuit pattern including the electrodes of one of said sets, leader lines for the electrodes of the first group of said one set, and leader lines for the electrodes of the second group of the other set,
   c. forming an insulating pattern on said substrate by printing so as to form an intermediate insulating layer that will overlie said first circuit pattern, said insulating pattern including apertures for electrically connecting the electrodes of said second groups of said sets to the leader lines related thereto, and
   d. forming a second circuit pattern on said intermediate insulating layer by printing, said second circuit pattern including the electrodes of said other set, leader lines for said electrodes of the first group of said other set, and leader lines for the electrodes of the second group of said one set, and in which method when said second circuit pattern is printed, parts of said second circuit pattern positioned over said apertures of said insulating pattern forming said intermediate insulating layer are overlaid on parts of said first circuit pattern under the intermediate insulating layer thereby connecting said first and second mentioned parts electrically.

2. A method of producing a data tablet according to claim 1, characterised in that said first circuit pattern and said second circuit pattern are made of an electrically conductive ink containing an electrically conductive material selected from carbon and silver powder and a phenolic type resin.

3. A method of producing a data tablet according to claim 1, characterised in that said insulating pattern is made of a bismaleimide triazine resin.

4. A data tablet, characterized in that it has an electrode matrix that includes two sets of electrodes, the sets of electrodes being arranged along coordinate axes on opposite sides of an intermediate insulating layer in such a way that the electrodes in one set are orthogonal to the electrodes in the other set, the electrodes of each of said sets constituting a first group and a second group, the electrodes in said first group being connected respectively to leading lines arranged in the same plane as of said electrodes in said first group, and the electrodes in said second group being connected via through-holes formed in said intermediate insulating layer respectively to other leader lines arranged in the same plane as of said electrodes of the other set.

5. A data tablet according to claim 4, characterised in that said intermediate insulating layer is made of a bismaleimide triazine resin.

* * * * *